(12) United States Patent
Terashima et al.

(10) Patent No.: US 7,344,257 B2
(45) Date of Patent: Mar. 18, 2008

(54) LIGHT SOURCE DEVICE AND PROJECTOR

(75) Inventors: Toru Terashima, Matsumoto (JP);
Shohei Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 11/178,352

(22) Filed: Jul. 12, 2005

(65) Prior Publication Data

US 2006/0033889 A1  Feb. 16, 2006

(30) Foreign Application Priority Data

Jul. 14, 2004  (JP) ............................. 2004-207791

(51) Int. Cl.
*G03B 21/20* (2006.01)
*F21V 7/00* (2006.01)

(52) U.S. Cl. ........................ 353/102; 353/98; 353/119; 362/262; 362/296

(58) Field of Classification Search .................. 353/98, 353/99, 85–87, 119, 122, 102; 362/210, 362/217–221, 261–265, 296, 310, 353, 416; 349/58–62, 67; *G03B 21/20*
See application file for complete search history.

(56) References Cited

U.S. PATENT DOCUMENTS

| | | | | |
|---|---|---|---|---|
| 5,957,570 A * | 9/1999 | Ooyama et al. | ............ | 362/263 |
| 6,002,197 A * | 12/1999 | Tanaka et al. | .............. | 313/113 |
| 6,784,601 B2 * | 8/2004 | Kai et al. | ...................... | 313/46 |
| 7,044,609 B2 * | 5/2006 | Fujisawa et al. | .............. | 353/99 |
| 7,097,309 B2 * | 8/2006 | Lee et al. | ..................... | 353/99 |

(Continued)

FOREIGN PATENT DOCUMENTS

JP      A 4-129162      4/1992

(Continued)

OTHER PUBLICATIONS

Meaning of ALONG, hyperdictionary, Oct. 12, 2007, http://www.hyperdictionary.com/search.aspx?define=along.*

(Continued)

*Primary Examiner*—Andrew T Sever
(74) *Attorney, Agent, or Firm*—Oliff & Berridge, PLC

(57) ABSTRACT

A light source device (10) has: a light-emitting tube (11) including a light-emitting portion (111) that emits a light beam through electrodes (114) and a pair of sealing portions (112, 113) provided on both sides of the light-emitting portion (111) and lead wires (200, 210) for making electrical continuity between the electrodes (114) and an external power source, the lead wires (200, 210) extending from the distal ends of the sealing portions (112, 113), respectively; and a reflector (12) having a concave reflecting surface (124) that emits, from the opening thereof, the light beam irradiated by the light-emitting tube (11) after aligning in a predetermined direction, in which the lead wire (200) extends from the sealing portion (112) on the light beam irradiation front side of the reflector (12) up to the opening end portion (125) of the reflector (12), the lead wire (200) having bent portions (221, 222, 223) in which the lead wire (200) is sequentially bent along the shape of the opening edge portion (125). The lead wire (200) is reliably fixed to the reflector (12) by the spring force between the bent portions (221, 222, 223).

10 Claims, 6 Drawing Sheets

U.S. PATENT DOCUMENTS

2002/0158581 A1  10/2002  Heike et al. .................. 315/56
2003/0193281 A1  10/2003  Manning .................... 313/113

FOREIGN PATENT DOCUMENTS

| JP | 04362624 A | * 12/1992 |
|---|---|---|
| JP | A 8-31382 | 2/1996 |
| JP | A 10-106493 | 4/1998 |
| JP | A 2003-132702 | 5/2003 |

OTHER PUBLICATIONS

Anonymous: "PTI Model A-1010 Lamp Housing Operation Manual", Jun. 19, 2004, Photon Technology International, XP002353655, Retrieved from Internet: URL:http://web.archive.org/web/20040619005431/http://pti-nj.com/manual_a1010.html.

* cited by examiner

LIGHT SOURCE DEVICE AND PROJECTOR

BACKGROUND OF THE INVENTION

1. Field of the Invention

The present invention relates to a light source device and a projector.

2. Description of Related Art

A Projector that modulates a light beam irradiated by a light source in accordance with image information and projects an optical image in an enlarged manner has been widely used, together with a personal computer, for presentation in meetings, academic conferences, exhibitions, or the like. In recent years, it has been used for at-home-movie-viewing.

As a light source device of the projector, a light source obtained by fitting a reflector to a light-emitting tube such as a metal halide lamp, a high-pressure mercury lamp, or halogen lamp is used. An electrical continuity between the light-emitting tube and an external power source is made by a lead wire welded to base caps of sealing portions disposed on both sides of the light-emitting tube.

As disclosed in Jpn. Pat. Laid-Open Publication No. 2003-132702 (see FIG. 5 and the like), a light-emitting tube projects in a reflector. In this document, in order to draw a lead wire extending from the sealing portion on the projecting lead end out of the reflector and fix the drawn out lead wire to the reflector, for example, a configuration in which the lead wire is inserted through a hole formed on the reflector and the lead wire is fixed by a metal fitting at the hole portion has been adopted.

In the case where a front glass for preventing the scatter of broken pieces of the light-emitting tube upon burst of the same is provided, a configuration in which the lead wire is pinched between the edge portion of the front glass and opening edge portion of the reflector and fixedly bonded is employed to draw a lead wire extending from the sealing portion on the projecting lead end out of the reflector and fix the drawn out lead wire to the reflector.

Further, to draw out and fix the lead wire, a configuration like a light source lamp unit 10' shown in a sectional side view of FIG. 6 has been employed, for example. More specifically, in this light source lamp unit 10', a lead wire 200' extends from a fastener 116 of a first sealing portion 112 toward an opening edge portion 125 of an ellipsoidal reflector 12 and further extends toward the outside of the ellipsoidal reflector 12 in such a manner to cross the peripheral edge of the opening edge portion 125. The drawn out lead wire 200' extends along the periphery of the ellipsoidal reflector 12 and is fixed.

In any of the above configuration, the lead wire is fixed to a connection terminal to be connected to an external power source by welding or the like, the connection terminal being disposed near the reflector.

However, in the configuration of the above document, a hole or the like must be drilled in the reflector, decreasing an amount of the reflected light of the light source by the area corresponding to the hole. This reduces light utilization efficiency, thereby resulting in illumination loss.

In the case where the sealing portion projects beyond the reflector opening, the front glass cannot be provided depending on the shape of the light-emitting tube or reflector, in some cases. In this case, it is difficult to fix the lead wire to the reflector. If the lead wire is not fixed to the reflector reliably, the lead wire has possibility of falling off from the welding portion when, for example, the lead wire is connected to the connection terminal for an external power source. Specifically, when the lead wire may be pulled or pushed and contracted, a certain load is applied to the welding portion of the lead wire at the distal end of the sealing portion, whereby the lead wire to come free from the welding portion, as often as not. In addition, the possibility that the light-emitting tube is broken or damaged by the applied load occurs to decrease built-in characteristics or reliability of the light source device. That is, there has been a need to realize a mechanism for reliably fix the lead wire even in the case where the front glass or the lie is not used.

In the wiring of the lead wire 200' of the light source lamp unit 10' as shown in FIG. 6, the lead wire 200' is not fixed to the ellipsoidal reflector 12. Accordingly, the lead wire 200' tends to be displaced at the opening edge portion 125 of the ellipsoidal reflector 12, or tends to slip off the opening edge portion 125, making it difficult to perform the wiring work of fixing the lead wire 200' to a terminal block Further, during the wiring work, if the lead wire 200' is pulled, or conversely, pushed and contracted, a certain load is applied to the welding point on a fastener 116 of the distal end of the first sealing portion 112, with the result that the lead wire 200' may slip off the fastener 116 or the light source lamp 11 may be broken or damaged.

SUMMARY OF THE INVENTION

Aspect of the present invention can provide a light source device capable of reliably fixing a lead wire without involving decrease in light utilization efficiency and a projector provided with the light source device.

An exemplary a light source device according to an aspect of the present invention can include: a light-emitting tube including a light-emitting portion that emits a light beam through electrodes and a pair of sealing portions provided on both sides of the light-emitting portion and lead wires for making electrical continuity between the electrodes and an external power source, the lead wires extending from the distal ends of the sealing portions, respectively; and a reflector having a concave reflecting surface that irradiates, from the opening thereof, the light beam emitted by the light-emitting tube after being aligned in a predetermined direction. The light-emitting tube is provided such that one of the pair of sealing portions projects toward the light beam irradiation front side of the reflector. The lead wire extending from one of the sealing portions extends up to the opening edge portion of the reflector. The lead wire has a fold-down portion in which the lead wire extending up to the opening edge portion of the reflector is bent along the shape of the opening edge portion.

According to the exemplary light source device, the lead wire extending from one of the sealing portions that projects toward the light beam irradiation front side of the reflector up to the opening edge portion of the reflector has the fold-down portion in which the lead wire is sequentially bent along the shape of the opening edge portion. With this configuration, the opening edge portion is sandwiched by the fold-down portion to allow the lead wire to be easily and reliably fixed to the reflector. As a result, a satisfactory attachment intensity between the lead wire and the reflector can be obtained, so that the lead wire can bear an external force applied when the lead wire is pulled, or conversely, pushed and contracted during the wiring work in which the lead wires are routed or when the lead wire experiences a shock, preventing the lead wire from being slipped off or being displaced from the distal end of the sealing portion. This prevents the light-emitting tube from being broken or damaged even when the load caused by an external force is applied to the welding point at the distal end of the sealing portion. Therefore, it is possible to easily incorporate the light source device in apparatuses such as a projector and to increase reliability thereof.

Further, a hole or the like for fixing the lead wire need not be formed in the reflector, avoiding a decrease in light utilization efficiency.

In the exemplary light source device it is preferable that the fold-down portion includes: a first bent portion in which the lead wire extending from one of the sealing portions toward the inner circumferential surface of the opening edge portion is bent to the edge side of the opening edge portion of the reflector along the inner circumferential surface of the opening edge portion; a second bent portion in which the lead wire bent in the first bent portion is again bent along the end face of the opening edge portion; and a third bent portion in which the lead wire bent in the second bent portion is again bent along the outer circumferential surface of the reflector.

According to the exemplary light source device, the lead wire is folded down in such a manner to sandwich the opening edge portion of the reflector in the thickness direction thereof, so that a spring force of the fold-down portion acts both on the inner and outer circumferential surfaces of the reflector. With this configuration, the lead wire can be fixed to the reflector more reliably. Further, spring forces of the first, second, and third bent portions are combined to act as resistance against each other, contributing to reliable fixing between the lead wire and reflector.

In the exemplary light source device, it is preferable that the reflector be an ellipsoidal reflector having a ellipsoid of revolution shaped reflecting surface. Furthermore, the light source device can include a sub-reflecting mirror that has a reflecting surface disposed opposite to the reflecting surface of the ellipsoidal reflector. The reflecting surface of the sub-reflecting mirror can reflect the light beam irradiated by the light-emitting tube toward the ellipsoidal reflector.

According to the exemplary light source device, the light beam irradiated by the light-emitting portion and directed to the opposite side of the reflecting surface of the ellipsoidal reflector is reflected by the sub-reflecting mirror in the direction toward the ellipsoidal reflector. As a result, substantially all the light beams emitted by the light-emitting portion are converged on the second focal position situated on the light beam irradiation front side by the ellipsoidal reflector, significantly increasing light utilization efficiency.

Further, by providing the sub-reflecting mirror, it is possible to reduce the opening diameter and dimension in the optical axis direction of the elliptical reflector realizing miniaturization of the light source device.

Since the sealing portion projects beyond the opening of the ellipsoidal reflector, it is hard to provide the front glass or the like for covering the opening of the reflector and therefore, difficult to fix the lead wire by inserting the lead wire between the edge portion of the front glass and edge portion of the reflector. In the exemplary light source device, however, the lead wire is reliably fixed to the reflector by the fold-down portion, as described above. Thus, the exemplary light source device can be very useful for the light source device having the ellipsoidal reflector and sub-reflecting mirror and in which the sealing portion of the light-emitting tube projects beyond the opening of the reflector.

In the exemplary light source device, it is preferable that the lead wire including the fold-down portion be disposed in a plane including the center axis of the light beam irradiated by the reflector.

According to the exemplary light source device, the dimension in which the lead wire crosses the light path of the light beam irradiated by the reflector in the area between one of the sealing portions to the opening edge portion of the reflector is small so that the light shielding amount by the lead wire can be reduced thereby contributing to an increase in light utilization efficiency.

Incidentally, when the opening of the reflector is a circle, it is preferable that the lead wire extend from the vicinity of the light emitting portion in accordance with the radius position of the circle. Thus, the dimension in which the lead wire crosses the light path of the light beam irradiated by the reflector can be made to be the shortest, so that the light shielding amount by the lead wire can further be reduced.

In the exemplary light source device, it is preferable that the lead wire including the fold-down portion further include a fourth bent portion in which the lead wire extending from one of the sealing portions toward the light emitting portion substantially along the center axis of the light beam irradiated by the reflector is bent to the opening end portion at the vicinity of the light emitting portion.

According to the exemplary light source device, the lead wire hardly shields a light in the portion where the lead wire extends along the center axis direction of the light beam irradiated by the reflector. Further, the dimension in which the lead wire crosses the light path of the light beam irradiated by the reflector in the area between the vicinity of the light emitting portion and opening edge portion of the reflector is small, so that the light shielding amount by the lead wire can be reduced as much as possible. This contributes to an increase in light utilization efficiency.

Further, in the case where the ellipsoidal reflector that converges light beams on the second focal position of the ellipsoid situated on the light beam irradiation front side relative to the opening of the reflector is used, the fourth bent portion is formed at the vicinity of the light emitting portion, so that it is possible to wire the lead wire such that the lead wire crosses the light beam at positions away from the second focal position. That is, by forming the fourth bent portion at the vicinity of the light emitting portion, it is possible to reduce the ratio of the area shielded by the lead wire that crosses the converged light to the area of the cross section of the converged light orthogonal to the irradiation direction. This is because the irradiated light beam from the reflector is converged toward the second focal position of the ellipsoid, so that the cross sectional area thereof orthogonal to the light beam irradiation direction is decreased. This configuration can contribute to an increase in light utilization efficiency.

An exemplary projector according to another aspect of the present invention can modulate the light beam irradiated by a light source in accordance with image information to form an optical image and projects the optical image in an enlarged manner, the projector including the aforementioned light source device.

According to the exemplary projector, since the light source device has the aforementioned effects and advantages, the projector can obtain the same effects and advantages as those of the light source device. That is, the light source device is excellent in light utilization efficiency, so that the projector can form a bright and clear projection image. Further, the lead wire that makes electrical continuity between the light-emitting portion and an external power source is reliably fixed, easily incorporating the light source device in the projector and thereby increasing product reliability.

DETAILED DESCRIPTION OF THE PREFERRED EMBODIMENTS

An exemplary embodiment according to aspects of the present invention will be described below with reference to the accompanying drawings.

Figure 1:
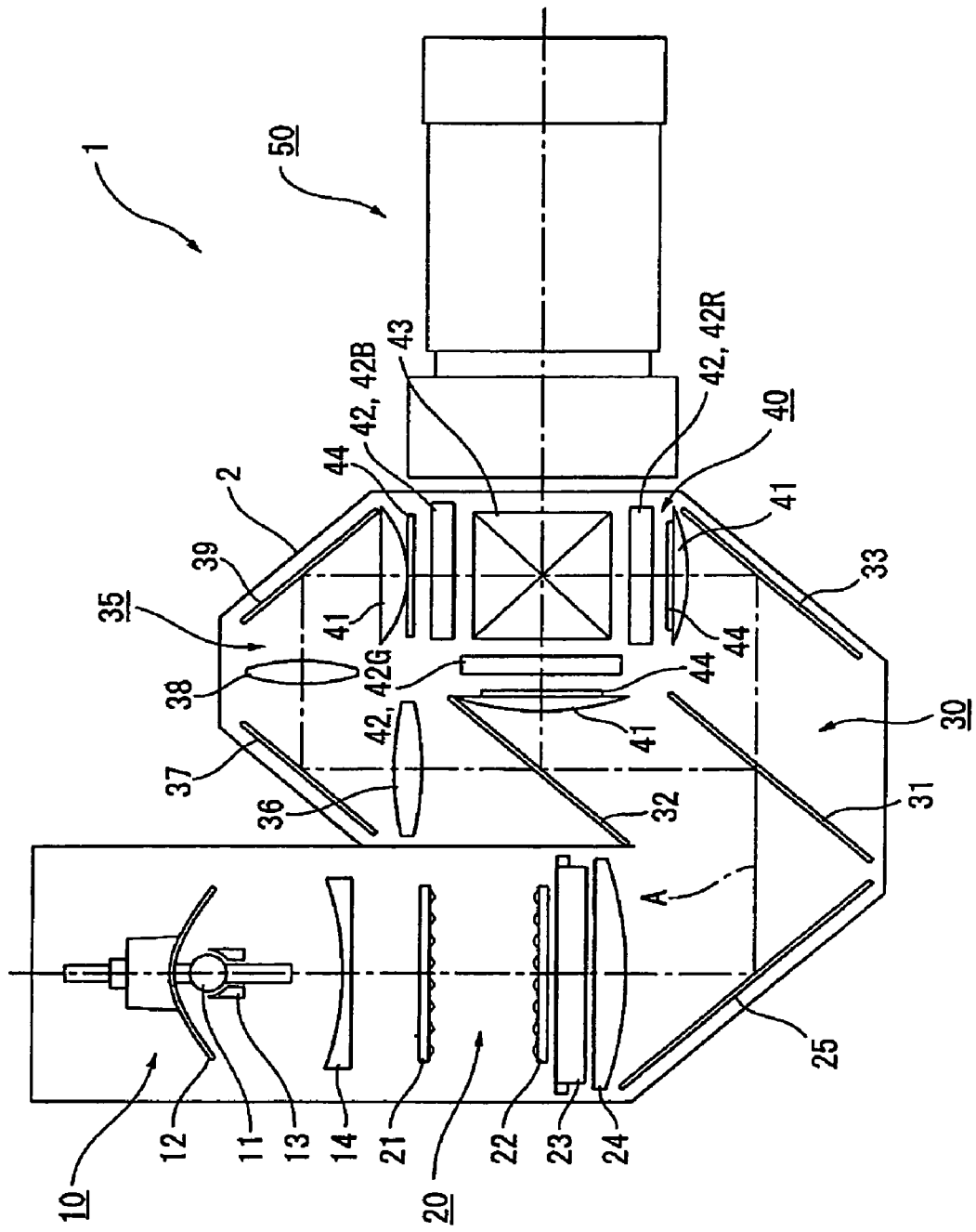
FIG. 1 is a plan view schematically showing an optical system of a projector according to an exemplary embodiment of the present invention.

FIG. 1 is a schematic view showing an optical system of a projector 1 according to an exemplary embodiment. The projector 1 is an optical apparatus that can form an optical image by modulating a light beam irradiated by a light source in accordance with image information and project the optical image on a screen in an enlarged manner. The projector 1 can include a light source lamp unit 10 serving as a light source device, a integrator illumination optical system 20, a color separating optical system 30, a relay optical system 35, an optical device 40 and a projection optical system 50. Optical elements of the optical systems 20 through 35 can be housed with the positions thereof being adjusted within an optical components casing 2 where a predetermined illumination optical axis A is set.

The light source lamp unit 10 can irradiate the light beam emitted by the light source lamp 11 after aligning in a predetermined direction to illuminate the optical device 40, and include a light source lamp 11, an ellipsoidal reflector 12, a sub-reflecting mirror 13 and a parallelizing concave lens 14, of which details will be described below.

The light beam emitted by the light source lamp 11 is irradiated as a convergent light after the irradiating direction thereof being aligned toward the front side of the optical device by the ellipsoidal reflector 12, and is collimated by the parallelizing concave lens 14 to be irradiated to the integrator illumination optical system 20. The center axis of the light beam irradiated by the ellipsoidal reflector 12 is coincident with the illumination optical axis A.

The integrator illumination optical system 20 can separate the light beam irradiated by the light source lamp unit 10 into a plurality of sub-beams to equalize the in-plane illuminance of an illuminating area. The system 20 can include a first lens array 21, a second lens array 22, a PBS array 23, a condenser lens 24 and a reflection mirror 25.

The first lens array 21 functions as a light beam separating optical element that separates the light beam irradiated by the light source lamp 11 into a plurality of sub-beams, and has a plurality of small lenses arranged in a matrix on a plane orthogonal to the illumination optical axis A, each profile of the respective small lenses being arranged to be approximately similar to the profile of image formation areas of liquid crystal panels 42R, 42G, 42B of the optical device 40 (described below).

The second lens array 22 is an optical element for condensing the plurality of sunbeams separated by the above first lens array 21, and has a plurality of small lenses arranged in a matrix on a plane orthogonal to the illumination optical axis A as the first lens array 21, however, each profile of the respective small lenses is not required to correspond with the profile of the image formation areas of the liquid crystal panels 42R, 42G, 42B since the second lens array 22 is for condensing the light.

The PBS array 23 is a polarization conversion element that can convert polarizing directions of the respective sub-beams separated by the first lens array 21 into one linear polarized light of a predetermined direction.

Though not shown, the PBS array 23 has an alternate arrangement of a polarization separating film and a reflection mirror both inclined relative to the illumination optical axis A. The polarization separating film transmits either P-polarized light beam or S-polarized light beam contained in the respective sub-beams whereas reflects the other polarized light beam. The reflected polarized light beam is bent by the reflection mirror to be irradiated in a direction to which the transmitted polarized light beam is irradiated, i.e., in a direction along the illumination optical axis A One of the irradiated P-polarized light beam and the S-polarized light beam is converted by a phase plate provided on a light beam irradiation side of the PBS array 23 so that the polarizing directions of all polarized light beams are aligned. With the use of such PBS array 23, the light beam irradiated by the light source lamp 11 can be aligned as the polarized light beam in a predetermined direction, so that the utilization ratio of the light to be used in the optical device 40 can be enhanced.

The condenser lens 24 can condense the plurality of sub-beams after passing the first lens array 21, the second lens array 22 and the PBS array 23 to superpose the condensed light beam on the image formation areas of the liquid crystal panels 42R, 42G, 42B. Though the condenser lens 24 is a spherical lens in the exemplary embodiment, a light beam transmitting area thereof having a flat light incident side and a spherical light irradiation side, an aspherical lens having a hyperboloidal light irradiation side may alternatively be used.

The light beam irradiated by the condenser lens 24 is bent by the reflection mirror 25 and irradiated to the color separating optical system 30.

The color separating optical system 30 can have two dichroic mirrors 31 and 32 and a reflection mirror 33, the dichroic mirrors 31 and 32 separating the plurality of sub-beams irradiated by the integrator illumination optical system 20 into three color lights of red (R), green (G) and blue (B).

The dichroic mirrors 31 and 32 are optical elements each having a base on which a wavelength-selection film that reflects a light beam of a predetermined wavelength and transmits a light beam of the other wavelength is formed. The dichroic mirror 31 disposed on the upstream of the optical path is a mirror that transmits the red light and reflects other color lights. The dichroic mirror 32 disposed on the downstream of the optical path is a mirror that reflects the green light and transmits the blue light.

The relay optical system 35 can have an incident-side lens 36, a relay lens 38, and reflection mirrors 37 and 39, and guide the blue light transmitted through the dichroic mirror 32 of the color separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than the optical path of other color lights. Though such arrangement is used in the exemplary embodiment because of the longer optical path of the blue light, a configuration may be employed in which the optical path of the red light is lengthened and the relay optical system 35 is used for the optical path of the red light.

The red light separated by the above-described dichroic mirror 31 is bent by the reflection minor 33 and, subsequently, fed to the optical device 40 through a field lens 41. The green light separated by the dichroic mirror 32 is directly fed to the optical device 40 through the field lens 41. The blue light is condensed and bent by the lenses 36, 38 and the reflection mirrors 37 and 39 of the relay optical system 35 to be fed to the optical device 40 through the field lens 41. Incidentally, the field lenses 41 provided on the upstream of the optical path of the respective color lights of the optical device 40 are provided for converting the respective sub-beams irradiated by the second lens array 22 into light beams parallel to the illumination optical axis A.

The optical device 40 can form a color image by modulating the incident light beam in accordance with image information. The optical device 40 can include liquid crystal panels 42 (42R, 42G, 42B) serving as an optical modulator to be illuminated and a cross dichroic prism 43 serving as a color-combining optical system. In addition, incident-side polarization plates 44 are respectively interposed between the field lenses 41 and the liquid crystal panels 42R, 42G, 42B, and, through not shown in the figure, irradiation-side polarization plates are respectively interposed between the liquid crystal panels 42R, 42G, 42B and the cross dichroic prisms 43 so as to modulate the respective incident color lights through the incident-side polarization plates 44, the liquid crystal panels 42R, 42G, 42B and the irradiation-side polarization plates.

The liquid crystal panels 42R, 42G, 42B each have a pair of light-transmissive glass substrates with liquid crystal as electro-optic material sealed therebetween to modulate the polarizing direction of the polarized light beam irradiated by each incident-side polarization plate 44 in accordance with given image signal by using, for instance, a polysilicon TFT as a switching element. Each image formation area of the liquid crystal panels 42R, 42G, 42B for modulation has a rectangular shape having diagonal length of 0.7 inch, for example.

The cross dichroic prism 43 is an optical element that can combine the optical image irradiated by the irradiation-side polarization plates and modulated for each color light to form a color image. The cross dichroic prism 43 can contain four right-angle prisms mutually bonded in an approximately planarly-viewed square. Dielectric multi-layer films can be formed on the substantially X-shaped boundaries where the four right-angle prisms are mutually bonded. One of the X-shaped dielectric multi-layer films reflects the red light and the other one reflects the blue light, the red light and the blue light being bent by the dielectric multi-layer films and aligned with the advancement direction of the green light, so that the three color lights are combined.

The color image irradiated by the cross dichroic prism 43 is projected by the projection optical system 50 in an enlarged manner to form a large-size image on a screen (not shown).

Figure 2:
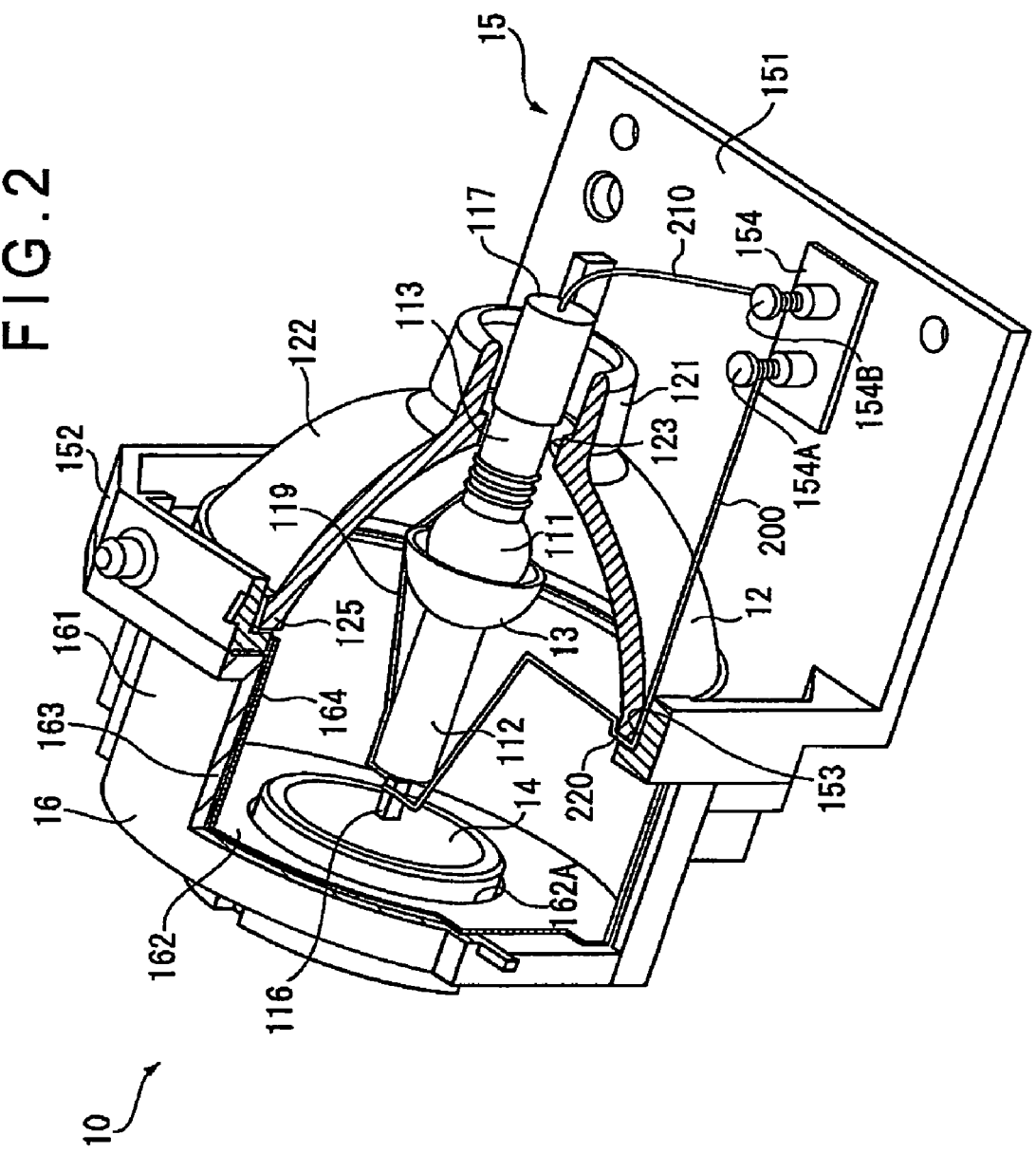
FIG. 2 is a perspective view showing a light source lamp unit according to the aforesaid exemplary embodiment.

FIG. 2 is a perspective view showing a light source lamp unit 10 obliquely from behind.

The light source lamp unit 10 includes the aforementioned light source lamp 11, ellipsoidal reflector 12, sub-reflecting mirror 13, and the parallelizing concave lens 14. The light source lamp unit 10 further includes a holder 16 that holds the parallelizing concave lens 14, and a lamp housing 15.

The light source lamp 11 as a light-emitting tube has a silica glass tube with the central portion thereof being spherically bulged, the central portion being a light-emitting portion 111 and the portions extending on both sides of the light-emitting portion 111 being a pair of sealing portions 112 (first sealing portion) and 113 (second sealing portion). In the exemplary embodiment, one of the sealing portions is a first sealing portion 112 whereas the other one is a second sealing portion 113.

A metal halide lamp is used as the light source lamp 11 in the exemplary embodiment Alternatively, however, various types of lamps such as a discharge type light-emitting tube including a high-pressure mercury lamp, a super high-pressure mercury lamp, and a xenon lamp, in which discharge light emission is made between a pair of electrodes, as well as a halogen lamp may be used as the light source lamp 11.

Figure 3:
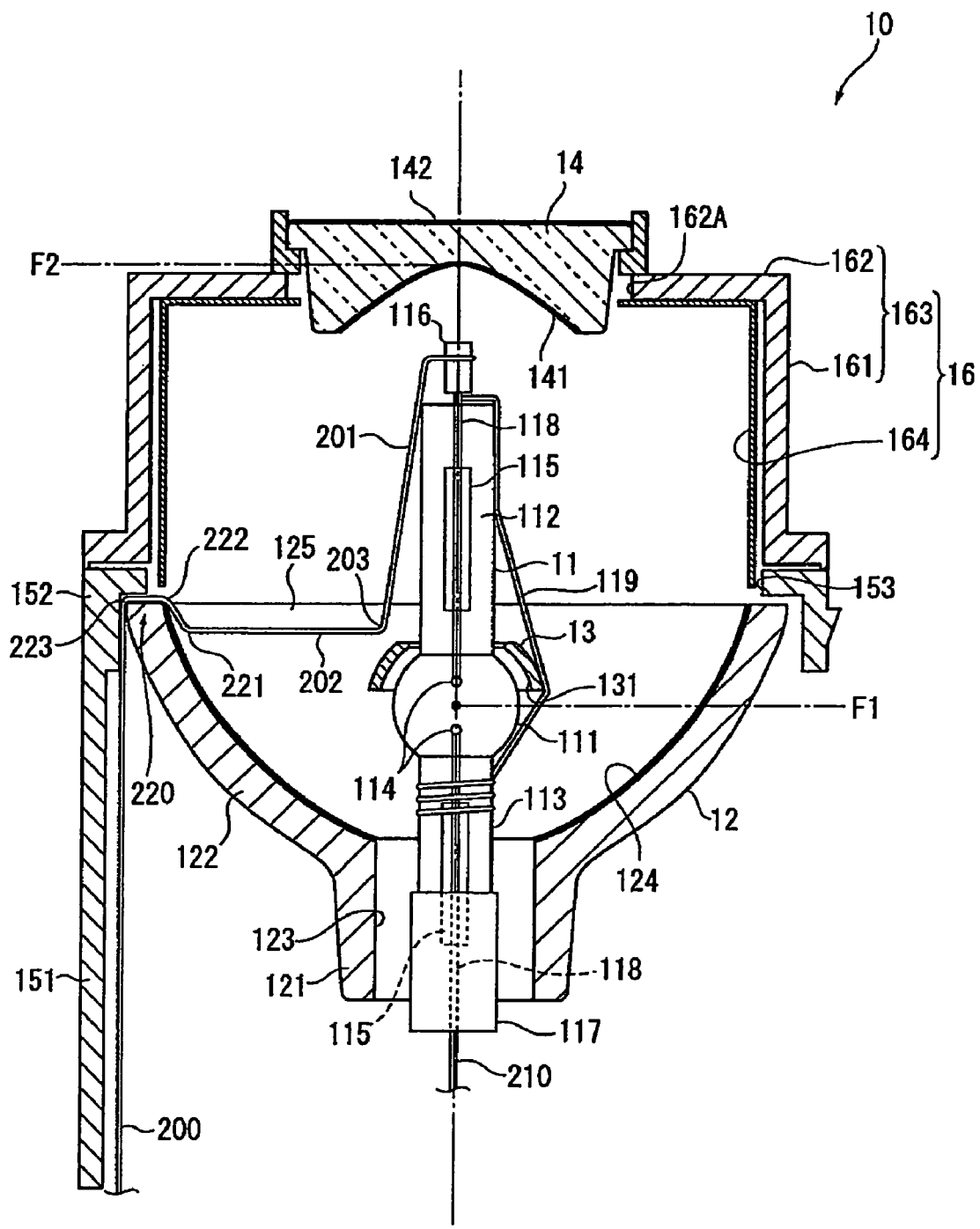
FIG. 3 is a sectional side view of the light source lamp unit according to the aforesaid exemplary embodiment.

FIG. 3 is a sectional side view of the light source lamp unit 10.

A pair of tungsten electrodes 114 spaced apart with each other in a given interval, mercury, rare gas and a small amount of halogen are sealed in the light-emitting portion 111.

Metal foils 115 of molybdenum are inserted in the sealing portions 112 and 113, respectively, the metal foils 115 being electrically connected with the electrodes 114 in the light-emitting portion 111. The metal foils 115 are electrically connected to a lead wire 118 as an electrode outgoing line, the lead wire 118 extending to the outside of the light source lamp 11 from the sealing portions 112 and 113. The lead wire 118 extending from the distal end of the first sealing portion 112 is electrically connected to a lead wire 200 through the fastener 116. The lead wire 118 extending from the distal end of the second sealing portion 113 is drawn to the outside through a base cap 117 so provided as to cover the distal end of the second sealing portion 113 and connected to a lead wire 210. The lead wires 200 and 210 are connected to the fastener 116 and base cap 117, respectively, by soldering or by pressure bonding. When a predetermined voltage is applied through the lead wires 200 and 210 from an external power source, arc discharge is generated between the pair of electrodes 114 and the light-emitting portion 111 emits a light beam.

As the lead wire 200 or 210, it is possible to use a linear element made of metal such as nickel or gold, or an alloy of these materials having the rigidity corresponding to that of, e.g., a wire and capable of maintaining the shape of the bent portion. The base cap 117 is a member for protecting the second sealing portion 113. The base cap 117 may be omitted when there is no need to use it. The lead wire 118 to be drawn out from the distal end of the second sealing portion 113 may be elongated to be used as the lead wire 210. As the fastener 116, a ring sleeve or a pressure connection terminal can be adopted.

A heating wire 119 is wound around the second sealing portion 113 at the vicinity of the light-emitting portion 111. The heating wire 119 allows current to flow therethrough to induce electric discharge between the electrodes 114 at the starting time of the projector 1. The end portion of the heating wire 119 is welded to the fastener 116 at the distal end of the first sealing portion 112. Preheating effect of the heating wire 119 on the light emitting portion 111 allows halogen cycle to start at an early time, thereby lighting the light source lamp 11 quickly.

The ellipsoidal reflector 12 is an integral molding consisting of silica glass, sapphire glass, crystal, fluorite, YAG (Yttrium Aluminium Garnet, Y3A15O12), and the like including a neck portion 121 and a ellipsoid of revolution shaped reflecting portion 122 spreading from the neck portion 121.

An insertion hole 123 is formed on the neck portion 121 at the middle, and the second sealing portion 113 is disposed in the insertion hole 123.

A reflecting surface 124 is obtained by forming a dielectric multi-layer film on the surface of the reflecting portion 122. The reflecting surface 124 serves as a cold mirror that reflects visible lights and transmits infrared rays or ultraviolet rays. It is preferable that the reflecting surface 124 be formed by interlamination of a tantalum compound and SiO2, or a hafnium compound and SiO2 using vacuum evaporation of a metal thin film, in view of heat resistance.

When the above light source lamp 11 is fixed to the ellipsoidal reflector 12, the second sealing portion 113 is inserted into the insertion hole 123 of the ellipsoidal reflector 12, the light source lamp 11 is disposed so that the light-emission center between the pair of electrodes 114 in the light-emitting portion 111 is coincident with a first focal position F1 of the ellipsoidal curve of the reflecting surface 124, and a silica-alumina inorganic adhesive is filled inside the insertion hole 123.

The dimension of the reflecting portion 122 in the direction of the illumination optical axis A is shorter than the length of the light source lamp 11, so that when the light source lamp 11 is fixed on the ellipsoidal reflector 12 as described above, the first sealing portion 112 of the light source lamp 11 projects from a light incident side opening edge 125 of the ellipsoidal reflector 12.

The sub-reflecting mirror 13 is a reflecting member that is so disposed as to cover substantially the front half of the light-emitting portion 111 of the light source lamp 11 and to face the reflecting surface 124 of the ellipsoidal reflector 12. A reflecting surface 131 of the sub-reflecting mirror 13 is formed in a concave curve along the spherical surface of the light-emitting portion 111. The subreflecting mirror 13 is manufactured using, for example, a low-thermal expansion material such as quartz or Neocerarn, or a high-thermal conductive material such as light-transmissive aluminum, sapphire, crystal, fluorite, YAG (Yttrium Aluminium Garnet, Y3A15O12). Like the ellipsoidal reflector 12, the reflecting surface 131 is formed of a dielectric multi-layer film that reflects visible lights and transmits infrared rays or ultraviolet rays.

The parallelizing concave lens 14 is a member for collimating the light beam that has been emitted by the light source lamp 11 and reflected in a predetermined direction by the ellipsoidal reflector 12. A light beam incident side surface 141 is formed in an aspherical shape, e.g., a hyperboloidal shape and a light beam irradiation side surface 142 thereof is formed in a flat shape.

Anti Reflection Coating (AR coating) is applied on the light beam incident side surface 141, and an ultraviolet protection film is formed on the light beam irradiation side surface 142, thereby enhancing light utilization efficiency and preventing the optical components and the like disposed on the downstream of the light source lamp unit 10 from being degraded due to influence of ultraviolet rays.

The holder 16 has a cylindrical shape formed in corresponding the opening edge portion 125 of the ellipsoidal reflector 12, the holder 16 holding the outer circumferential edge of the parallelizing concave lens 14 on the side opposite to the ellipsoidal reflector 12 and covering the opening of the ellipsoidal reflector 12. Further, holder 16 prevents the scatter of broken glass pieces or the like of the light source lamp 11 upon burst of the lamp 11.

The holder 16 has a double structure of a holder main body 163 and a light absorption member 164 provided inside the holder main body 163.

The outside holder main body 163 is formed from an injection molded synthetic resin such as polyphenylene sulfide (PPS) or Vectra (LCP) and is constituted by a cylinder portion 161 and a holder portion 162, which are integrally formed. The cylinder portion 161 has a cylindrical shape corresponding to the shape of the opening edge portion 125 of the ellipsoidal reflector 12, the cylinder portion 161 covering the light source lamp 11. The holder portion 162 is so formed as to seal the light beam irradiation side edge surface of the cylinder portion 161. An opening 162A is formed at the holder portion 162, and the parallelizing concave lens 14 is fitted to the opening 162A.

As the light absorption member 164 formed inside, various members capable of shielding the light towards the holder main body 163 from the light source lamp as well as having low reflectance and thereby capable of absorbing light may be adopted. In order to reduce reflectance, while having light shielding properties, a metal plate made of aluminum, magnesium, titanium, iron, copper, or an alloy of theses metals is used as a base plate, and the inner surface of the base plate is subjected to black alumite treatment or roughened by anti-corrosion processing, etching, or the like.

Although the reflectance of pure aluminum plate is about 80%, the application of the black alumite treatment reduces the reflectance not greater than 20%. Thus, the light beam incident on the light absorption member 164 is reliably absorbed and shielded.

Corrosion resistance and light absorption properties of the light absorption member 164, which is based on the black alumite treatment, protects the holder main body 163, thereby preventing thermal degradation and harmful gas such as siloxane from occurring.

Further, by means of the light absorption member 164, heat resistance of the entire holder 16 can be improved, so that a wide range of material options of the holder main body 163 is available. Therefore, it is possible to take action toward reduction in weight and cost or facilitation of molding.

As shown in FIG. 2, the lamp housing 15 is an integral synthetic resin molding with an L-shaped cross section, the lamp housing 15 having a horizontal portion 151 and the vertical portion 152.

The vertical portion 152 is a part for positioning the ellipsoidal reflector 12 in the optical axis direction. An opening 153 is formed on the vertical portion 152 along the light beam irradiation side edge of the ellipsoidal reflector 12. The opening edge portion 125 of the ellipsoidal reflector 12 is fixed to the opening 153 by mechanical pressing or adhesive. The holder 16 is also adhesively fixed to the vertical portion 152.

The horizontal portion 151 engages with the wall of the optical components casing 2 to conceal the light source lamp unit 10 within the optical components casing 2 to prevent light leakage. The horizontal portion 151 includes a terminal block 154 having a pair of screws 154A and 154B for electrically connecting the light source lamp 11 to an external power source.

Incidentally, projections and recesses are provided on the horizontal portion 151 and the vertical portion 152. The projections/recesses respectively engage with recesses/projections formed inside the optical components casing 2 so that the light-emission center between the electrodes 114 of the light source lamp 11 is located on the illumination optical axis A of the casing 2.

Figure 4:
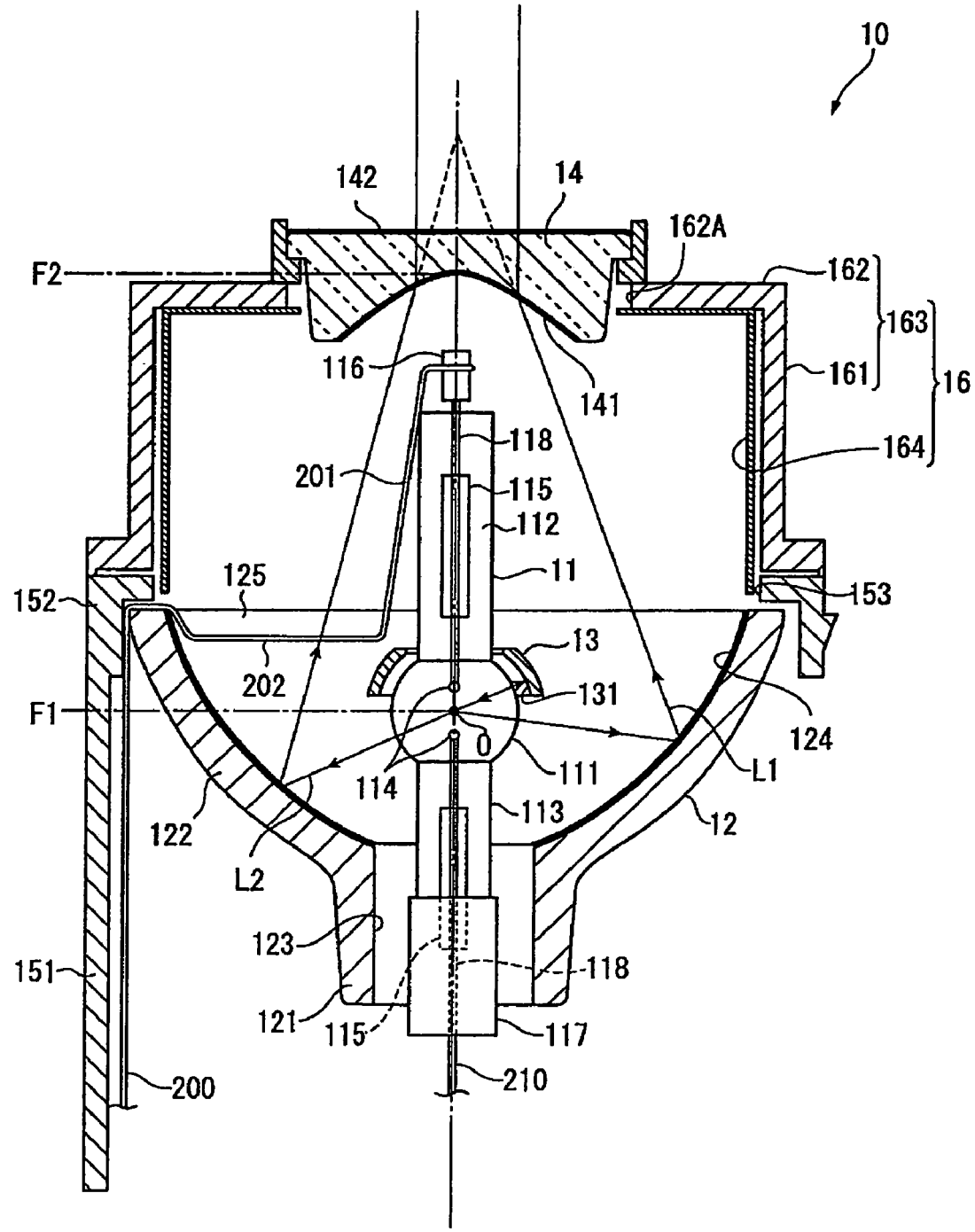
FIG. 4 is a sectional side view of the light source lamp unit and illustrating a pathway of a light beam irradiated by a light emitting section according to the aforesaid exemplary embodiment.

A description will next be given of the light beam irradiated by the light-emitting portion 111 with reference to FIG. 4, which is a sectional side view of the light source lamp unit 10. In FIG. 4, the heating wire 119 is omitted.

Of the light beam emitted from the light-emission center O of the light-emitting portion 111, a light beam L1 directed to the ellipsoidal reflector 12 is reflected by the reflecting surface 124 of the ellipsoidal reflector 12 to be irradiated toward a second focal position F2.

A light beam L2 irradiated from the light-emission center O of the light-emitting portion 111 and directed to the opposite side (light beam irradiation front side) of the ellipsoidal reflector 12 is reflected by the reflecting surface 131 of the sub-reflecting mirror 13 in the direction toward the ellipsoidal reflector 12, and again reflected by the reflecting surface 124 of the ellipsoidal reflector 12 to be converged on a second focal position F2. The light source lamp 11 is disposed so that the light-emission center between the electrodes 114 of the light-emitting portion 111 is coincident with the first focal position F1 of the ellipsoidal curve of the reflecting surface 124, so that the light beam emitted from between the electrodes 114 can be converged on the second focal position F2 by the ellipsoidal reflector and thereby can be used as a point source.

As described above, the use of the sub-reflecting mirror 13 allows the light beam irradiated by the light emitting portion 111 toward the opposite side (light beam irradiation front side) of the ellipsoidal reflector 12 to be reflected in such a direction to enter the reflecting surface 124 of the ellipsoidal reflector 12. Therefore, substantially all the light beams irradiated by the light emitting portion 111 are converged on the second focal position F2 of the ellipsoidal reflector 12, thereby significantly increasing light utilization efficiency.

Since substantially all the light beams irradiated by the light emitting portion 111 can be converged on a certain position and then irradiated as described above, a satisfactory light intensity can be obtained irrespective of the surface area of the reflecting surface 124. As a result, it is possible to reduce the dimension of the ellipsoidal reflector 12 in the direction of the optical axis and the opening diameter to realize miniaturization of the light source lamp unit 10 and projector 1, as well as to easily design the layout for incorporating the light source lamp unit 10 in the projector 1.

A description will next be given of the shape and wiring configuration of the lead wires 200 and 210 in the light source lamp unit 10, and a fixing mechanism therefore.

In the exemplary embodiment, the lead wire 200 can be fixed to the ellipsoidal reflector 12.

Figure 5:
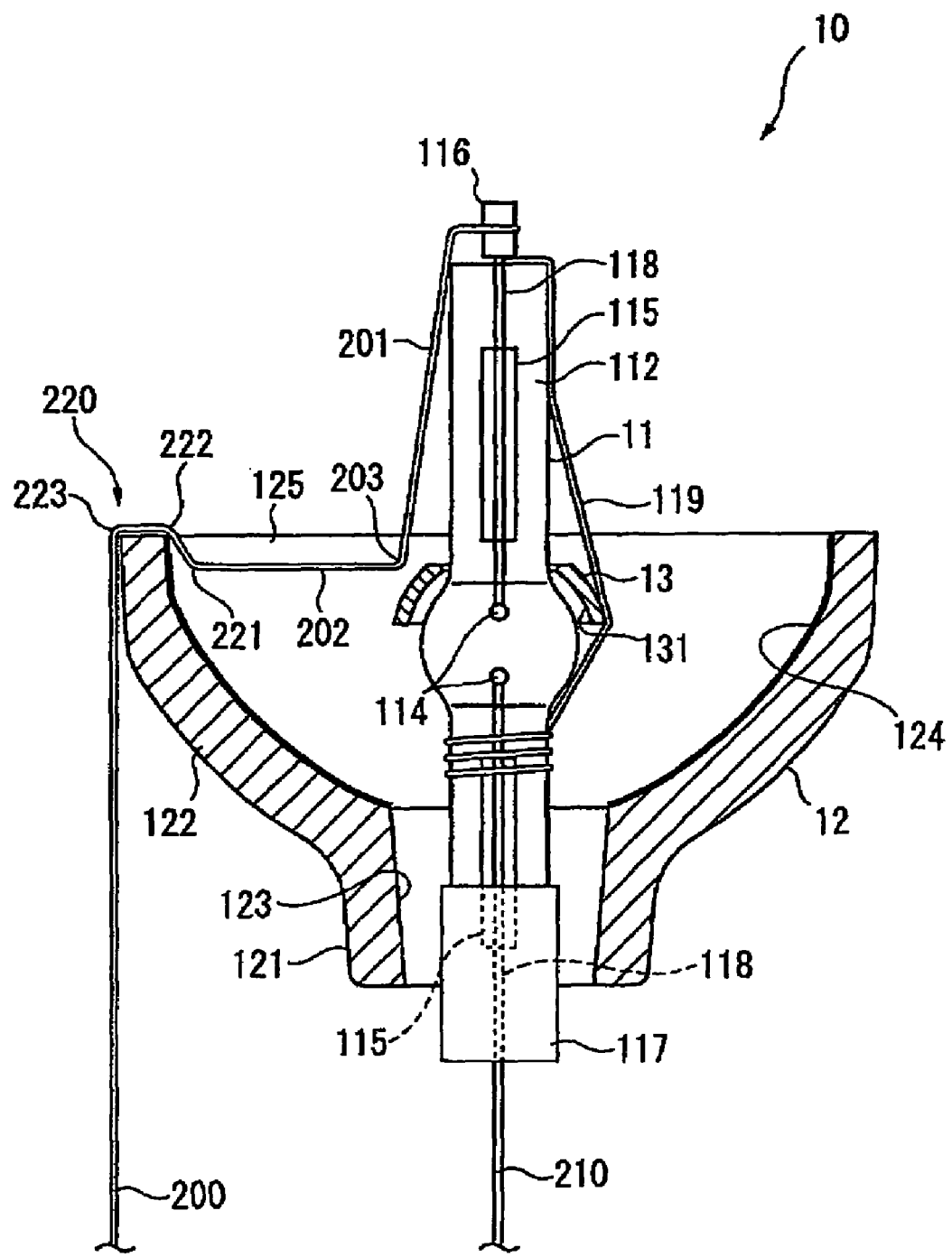
FIG. 5 is a partial side sectional view of the light source lamp unit according to the exemplary embodiment.
Figure 6:
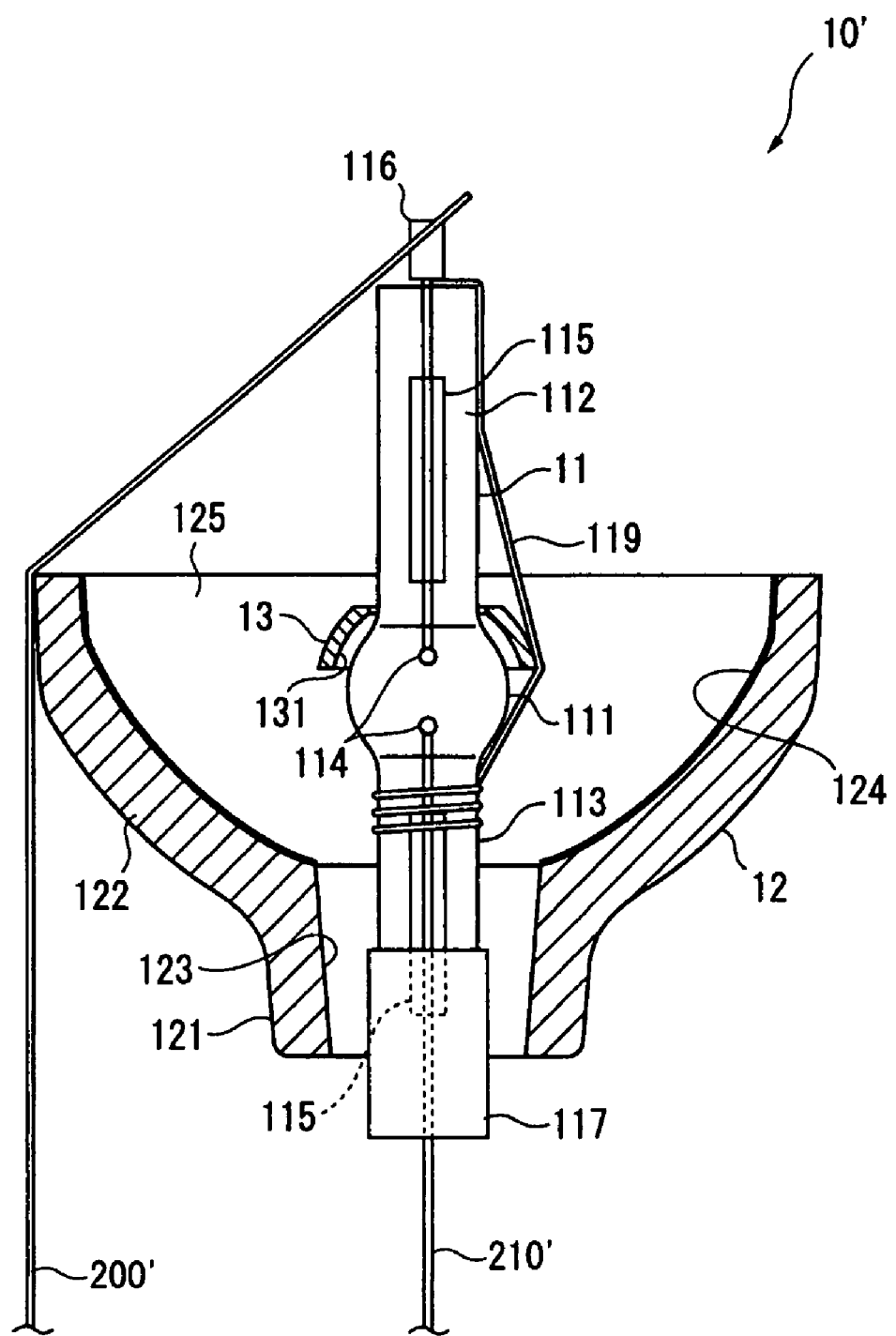
FIG. 6 is a partial side sectional view of a related art light source lamp unit.

FIG. 5 is a sectional side view showing the light source lamp 11, ellipsoidal reflector 12, and sub-reflecting mirror 13 of the light source lamp unit 10. In FIG. 5, the lamp housing 15 and holder 16 are omitted.

The lead wire 210 extending from the second sealing portion 113 passes through the neck portion 121 and extends outside of the ellipsoidal reflector 12. The drawn out distal end of the lead wire 210 is welded to the screw 154B of the terminal block 154 (FIG. 2).

Since the first sealing potion 112 projects from the opening of the ellipsoidal reflector 12 and the opening of the ellipsoidal reflector 12 is covered by the holder 16, the lead wire 200 extending from the first sealing portion 112 passes through the opening edge portion 125 of the ellipsoidal reflector 12 and is drawn out of the ellipsoidal reflector 12. The dawn out distal end of the lead wire 200 is welded to the screw 154A of the terminal block 154. In the exemplary embodiment, the lead wire 200 has bent portions that are formed by bending the lead wire 200.

In the plane including the center axis of the light beam irradiated by the ellipsoidal reflector 12, the lead wire 200 extends along the side surface of the first sealing portion 112 from the fastener 116 of the first sealing portion 112 to the portion near the light emitting portion 111, where the lead wire 200 is bent substantially at right angles to be directed toward the opening edge portion 125 of the ellipsoidal reflector 12, assuming L-shape when viewed from the direction perpendicular to the center axis of the light beam irradiated by the ellipsoidal reflector 12. Thus, a first straight portion 201 between the fastener 116 and light emitting portion 111, a second straight portion 202 between the light emitting portion 111 and opening edge portion 125, and a fourth bent portion 203 between the first and second straight portions 201 and 202 are formed on the lead wire 200. When the reflecting surface 124 of the ellipsoidal reflector 12 viewed from the light beam irradiation front side of the ellipsoidal reflector 12 along the illumination optical axis A, the lead wire 200 extends from the first sealing portion 112 to the opening edge portion 125 in a straight line. That is, the lead wire inside of the ellipsoidal reflector 12 is wired in a virtual plane including the center axis of the light beam irradiated by the ellipsoidal reflector 12.

The lead wire 200 extends along the illumination optical axis A in the first straight portion 201, so that the first straight portion 201 of the lead wire 200 hardly shields the light. Further, the lead wire 200 extends substantially perpendicular to the illumination optical axis A in the second straight portion 202, that is, the lead wire 200 crosses the light path of the light beam irradiated by the ellipsoidal reflector 12 by the most direct way, so that the light shielding amount by the lead wire 200 can be reduced as much as possible. Further, the second straight portion 202 extends up to the portion near the light emission portion 111 and thereby the fourth bent portion 203 is formed at the vicinity of the light emitting portion 111, so that the second straight portion 202 starts at the position retreated from the second focal position of the ellipsoidal reflector 12. By forming the fourth bent portion 203 nearer to the light emitting portion 111 as described above, it is possible to reduce the ratio of the area shielded by the second straight portion 202 that crosses the converged light to the area of the cross section of the converged light orthogonal to the irradiation direction. This is because the irradiated light beam from the ellipsoidal reflector 12 is converged toward the second focal position of the ellipsoid, so that the cross sectional area thereof orthogonal to the light beam irradiation direction is gradually decreased along with approaching the second focal position. This configuration can contribute to an increase in light utilization efficiency and, therefore, bright and clear projection image can be expected.

The lead wire 200 is again bent in accordance with the shape of the opening edge portion 125 of the ellipsoidal reflector 12 in such a manner to sandwich the opening edge portion 125 in the thickness direction thereof. The shape of the bent portion is maintained as a fold-down portion 220.

The lead wire 200 is bent in a sequential manner in the fold-down portion 220 along the shape of the opening edge portion 125 of the ellipsoidal reflector 12. Thus, a first bent portion 221, a second bent portion 222, and a third bent portion 223 are formed in the fold-down portion 220 in the order mentioned from the inside of the ellipsoidal reflector 12, that is, the reflecting surface 124 side.

More specifically, in the first bent portion 221, the straight portion 202 of the lead wire 200 extending from the portion near the light emitting portion 111 and approaching to come close to the reflecting surface 124 is bent to the edge side of the opening edge portion 125 along the reflecting surface 124. In the second bent portion 222, the lead wire 200 is bent at the inner circumferential edge in the opening edge portion 125 to the outer circumferential edge side along the end face. In the third bent portion 223, the lead wire 200 is bent at the outer circumferential edge of the opening edge portion 125 along the outer circumferential surface of the ellipsoidal reflector 12. As a result, the lead wire 200 assumes a hook-shape corresponding to the shape of the opening edge portion of the reflector. The spring force between the bent portions 221, 222, and 223 biases the fold-down portion 220 to sandwich the inner and outer circumferential surfaces of the ellipsoid reflector 12.

The hook-shape is altered in accordance with the shape of the reflector or light-emitting tube, wire configuration of the lead wire, or the like. For example, in the case where the lead wire comes into contact with the inner side surface of the reflector at substantially the center portion, the lead wire may be bent to the opening inner circumferential edge side at the contact portion, followed by being bent to the opening outer circumferential edge side at the opening inner circumferential side edge.

Simply by hooking the fold-down portion 220 having a hook-shape corresponding to the opening edge portion 125 of the ellipsoidal reflector 12 over the same, the lead wire 200 is reliably and easily fixed to the ellipsoidal reflector 12 using the spring force between the bent portions 221, 222, and 223. As a result, the intensity of the attachment between the lead wire 200 and the opening edge portion 125 of the ellipsoidal reflector 12 is increased so that the lead wire 200 does not slip off the opening edge portion 125 of the ellipsoidal reflector 12 even in the case where an external force is applied to the lead wire 200 when the lead wire 200 is pulled, or conversely, pushed and contracted during the wiring work in which the lead wires 200 and 210 routed or fixed to the terminal block 154 or the like, or when the lead wire 200 experiences an external shock. As described above, the fold-down portion 220 of the lead wire 200 is reliably fixed to the opening edge portion 125 of the ellipsoidal reflector 12 even when an external force is applied to the lead wire 200 extending along the outer circumferential side of the ellipsoidal reflector 12, suppressing influence of the external force on the lead wire 200 extending in the inner circumferential side of the ellipsoidal reflector 12. This prevents the lead wire 200 from coming free of the welding point at the distal end of the first sealing portion 112 and the light source lamp 11 from being broken or damaged due to the load applied to the welding point. Therefore, it is possible to easily perform the wiring work of the lead wire 200 and to increase reliability of the light source lamp unit 10 and projector 1. Further, simply by forming the fold-down portion 220, the lead wire 200 can easily be drawn out without the need of forming a hole or the like in the ellipsoidal reflector 12. This eliminates inconvenience that light utilization efficiency is decreased in proportion to the area of the hole.

The lead wire 200 is folded down in such a manner to sandwich the ellipsoidal reflector 12 in the thickness direction thereof, so that the spring force between the bent portions 221, 222, and 223 acts both on the inner and outer circumferential surfaces of the ellipsoidal reflector 12. As a result, the opening edge portion 125 of the ellipsoidal reflector 12 is tightly sandwiched by the lead wire 200 both from the inner and outer circumferential sides, so that the lead wire 200 can be fixed to the ellipsoidal reflector 12 more reliably.

The first sealing portion 112 projects beyond the opening of the ellipsoidal reflector 12 in the above configuration. Therefore, it is impossible to provide the front glass or the like for the opening of the ellipsoidal reflector 12 and therefore, impossible to fix the lead wire 200 by inserting the lead wire 200 between the edge portion of the front glass and opening edge portion 125 of the ellipsoidal reflector 12. In the exemplary embodiment, the lead wire 200 is reliably fixed to the ellipsoidal reflector 12 by the aforementioned fold-down portion 220. Thus, the fixing mechanism of the lead wire 200 according to the exemplary embodiment can be very useful for the light source lamp unit 10 having the ellipsoidal reflector 12 and sub-reflecting mirror 13 and in which the first sealing portion 112 projects beyond the opening of the ellipsoidal reflector 12.

The present invention is not limited to the above exemplary embodiment and can be changed and modified as in the following manner.

The shape and material of the light-emitting tube, reflector, lead wire, or sub-reflecting mirror, and the arrangement relationship between them are not limited to the above exemplary embodiment.

While the ellipsoidal reflector 12 is used as a reflector and the parallelizing concave lens 14 is used to collimate the light beam that has been converged on the second focal position F2 in the above exemplary embodiment, the present invention is not limited to this configuration. For example, a combination of a reflector having a paraboloidal reflecting surface and a convex lens that converges the light beam that has been reflected by the reflector may be adopted. The reflector has any shape as long as it serves as a convex lens.

Incidentally, in the above exemplary embodiment, even a configuration in which the sub-reflecting mirror 13 is not provided but the opening diameter of the ellipsoidal reflector 12 and the dimension of the same in the optical axis direction are increased can attain the effect and advantage of the present invention without problems.

In the above exemplary embodiment, while the first straight portion 201 and second straight portion 202 that crosses the first straight portion 201 are formed in the lead wire 200, the present invention is not limited to such shape. For example, the lead wire is not bent at the vicinity of the light emitting portion, but may extend in a straight line from the distal end of the sealing portion to near the opening edge portion of the reflector.

In short, the lead wire needs only to be bent at least two times along the shape of the opening edge portion of the reflector. With this configuration, a spring force is caused in the two bent portions in the directions different from each other, so that the lead wire can reliably be fixed to the opening edge portion of the reflector in such a manner that the two bent portions press the opening edge portion.

Therefore the bending direction, bending angle, bending shape, bending number, and the like of the lead wire are not limited to the above exemplary embodiment. For example, in the above exemplary embodiment, it is possible to additionally form a V-shape bent portion that goes and returns along the inner circumferential surface of the opening edge portion 125 of the ellipsoidal reflector 12. With this configuration, the opening edge portion 125 of the ellipsoidal reflector 12 is pressed by the V-shape bent portion and fold-down portion 220 with a stronger force.

As the lead wire, it is possible to use a linear element or the like made of metal such as nickel or gold, or an alloy of these materials having the rigidity corresponding to that of, e.g., a wire and capable of maintaining the shape of the bent portion.

Since the first sealing portion 112 projects beyond the opening of the ellipsoidal reflector 12, it is difficult to cover the opening of the ellipsoidal reflector 12 in the above exemplary embodiment. However, in this case, a glass plate having a hole through which the first sealing portion 112 can be passed may be used to cover the opening of the ellipsoidal reflector 12.

The present invention can be applied to the front type projector 1 that projects an image in a direction for observing a screen as described in the above exemplary embodiment, as well as to a rear-type projector that projects an image in a direction opposite to the direction for observing the screen.

While the preferred configuration, method, and the like for carrying out the present invention are disclosed in the above descriptions, the present invention is not limited to this. That is, while the present invention has been illustrated and described in conjunction of a specific preferred embodiment thereof, it is to be understood that numerous changes and modifications may be made to the shape, material, number, and other detailed configurations described in the above embodiment by those skilled in the art without departing from the spirit and scope of the present invention.

Therefore, the descriptions disclosed in the above that limit the shape, material, and the like are examples for making the present invention easier to understand and do not limit the present invention. Accordingly, descriptions made with names of the components in which a part of or all of the limitations such as the shape, material and the like have been released can be regarded as the present invention.

The priority application Number JP2004-207791 upon which this patent application is based is hereby incorporated by reference.

What is claimed is:

1. A light source device, comprising:
a light-emitting tube including a light-emitting portion that emits a light beam through electrodes and a pair of sealing portions provided on both sides of the light-emitting portion and lead wires for making electrical continuity between the electrodes and an external power source, the lead wires extending from the distal ends of the sealing portions, respectively; and a reflector having a concave reflecting surface that irradiates, from an opening thereof, the light beam emitted by the light-emitting tube after being aligned in a predetermined direction, wherein
the light-emitting tube is provided such that one of the pair of sealing portions projects toward the light beam irradiation front side of the reflector, and
the lead wire extending from one of the sealing portions extends up to an edge portion of the opening of the reflector located on the side from which the light beam is irradiated, the lead wire having a fold-down portion in which the lead wire extending up to the opening edge portion of the reflector is bent along the shape of the opening edge portion.

2. The light source device according to claim 1, wherein
the fold-down portion includes: a first bent portion in which the lead wire extending from one of the sealing portions toward the inner circumferential surface of the opening edge portion is bent to the edge side of the opening edge portion of the reflector along the inner circumferential surface of the opening edge portion; a second bent portion in which the lead wire bent in the first bent portion is again bent along the end face of the opening edge portion; and a third bent portion in which the lead wire bent in the second bent portion is again bent along the outer circumferential surface of the reflector.

3. The light source device according to claim 1, wherein
the lead wire including the fold-down portion is disposed in a plane including the center axis of the light beam irradiated by the reflector.

4. The light source device according to claim 1, further comprising:
a sub-reflecting mirror that has a reflecting surface,
the reflector is an ellipsoidal reflector having a ellipsoid of revolution shapedreflecting surface,
the reflecting surface of the sub-reflecting mirror is disposed opposite to the reflecting surface of the ellipsoidal reflector, and
the reflecting surface of the sub-reflecting mirror reflects the light beam irradiated by the light-emitting tube toward the ellipsoidal reflector.

5. The light source device according to claim 4, wherein
the lead wire including the fold-down portion further includes a fourth bent portion in which the lead wire extending from one of the sealing portions toward near the light emitting portion substantially along the center axis of the light beam irradiated by the reflector is bent to the opening end portion at the vicinity of the light emitting portion.

6. A projector that modulates the light beam irradiated by a light source in accordance with image information to form an optical image and projects the optical image in an enlarged manner, comprising a light source device which has a light-emitting tube including a light-emitting portion that emits a light beam through electrodes and a pair of sealing portions provided on both sides of the light-emitting portion and lead wires for making electrical continuity between the electrodes and an external power source, the lead wires extending from the distal ends of the sealing portions, respectively; and a reflector having a concave reflecting surface that irradiates, from the opening thereof, the light beam emitted by the light-emitting tube after being aligned in a predetermined direction, wherein
the light-emitting tube is provided such that one of the pair of sealing portions projects toward the light beam irradiation front side of the reflector, and
the lead wire extending from one of the sealing portions extends up to an edge portion of the opening of the reflector located on the side from which the light beam is irradiated, the lead wire having a fold-down portion in which the lead wire extending up to the opening edge portion of the reflector is bent along the shape of the opening edge portion.

7. The projector according to claim 6, wherein
the fold-down portion includes: a first bent portion in which the lead wire extending from one of the sealing portions toward the inner circumferential surface of the opening edge portion is bent to the edge side of the opening edge portion of the reflector along the inner circumferential surface of the opening edge portion; a second bent portion in which the lead wire bent in the first bent portion is again bent along the end face of the opening edge portion; and a third bent portion in which the lead wire bent in the second bent portion is again bent along the outer circumferential surface of the reflector.

8. The projector according to claim 6, wherein
the lead wire including the fold-down portion is disposed in a plane including the center axis of the light beam irradiated by the reflector.

9. The projector according to claim 6, further comprising:
a sub-reflecting mirror that has a reflecting surface,
the reflector is an ellipsoidal reflector having a ellipsoid of revolution shaped reflecting surface,
the reflecting surface of the sub-reflecting mirror is disposed opposite to the reflecting surface of the ellipsoidal reflector, and
the reflecting surface of the sub-reflecting mirror reflects the light beam irradiated by the light-emitting tube toward the ellipsoidal reflector.

10. The projector according to claim 9, wherein
the lead wire including the fold-down portion further includes a fourth bent portion in which the lead wire extending from one of the sealing portions toward near the light emitting portion substantially along the center axis of the light beam irradiated by the reflector is bent to the opening end portion at the vicinity of the light emitting portion.

* * * * *